(12) United States Patent
Dewan et al.

(10) Patent No.: US 11,526,389 B2
(45) Date of Patent: Dec. 13, 2022

(54) FAULT CHECK WITHOUT SOFTWARE INTERVENTION

(71) Applicant: Infineon Technologies AG, Neubiberg (DE)

(72) Inventors: Ketan Dewan, Unterhaching (DE); Juergen Schaefer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 381 days.

(21) Appl. No.: 16/891,312

(22) Filed: Jun. 3, 2020

(65) Prior Publication Data

US 2021/0382776 A1 Dec. 9, 2021

(51) Int. Cl.
| | |
|---|---|
| *G05B 23/02* | (2006.01) |
| *G06F 11/07* | (2006.01) |
| *G08B 21/18* | (2006.01) |
| *B60W 50/02* | (2012.01) |
| *H04L 12/40* | (2006.01) |
| *B60W 50/00* | (2006.01) |

(52) U.S. Cl.
CPC ..... *G06F 11/0739* (2013.01); *B60W 50/0205* (2013.01); *G08B 21/182* (2013.01); *G08B 21/185* (2013.01); *H04L 12/40* (2013.01); *B60W 2050/0006* (2013.01); *B60W 2050/021* (2013.01); *H04L 2012/40215* (2013.01); *H04L 2012/40273* (2013.01)

(58) Field of Classification Search
CPC ............ G06F 11/0739; G06F 11/0757; B60W 50/0205; B60W 2050/0006; B60W 2050/021; G08B 21/182; G08B 21/185; H04L 12/40; H04L 2012/40215; H04L 2012/40273
See application file for complete search history.

(56) References Cited

U.S. PATENT DOCUMENTS

| | | | |
|---|---|---|---|
| 10,530,366 B1* | 1/2020 | Dwivedi | .......... G01R 31/31706 |
| 2021/0302488 A1* | 9/2021 | Liu | .................. G01R 31/31701 |

* cited by examiner

*Primary Examiner* — Toan N Pham
(74) *Attorney, Agent, or Firm* — Banner & Witcoff Ltd.

(57) ABSTRACT

A fault check circuit, including a first channel comparator to output a first channel comparator output signal indicating whether a first channel digital signal is outside of a first channel threshold range, wherein the first channel digital signal is A/D converted from a first channel analog signal; a second channel comparator to output a second channel comparator output signal indicating whether a second channel digital signal is outside of a second channel threshold range, wherein the second channel digital signal is A/D converted from a second channel analog signal; and an alarm generator circuit to combine the first and second channel comparator output signals, and output a fault check signal, wherein the first and second channel comparators and the alarm generator circuit are implemented in hardware, and the fault check circuit performs a fault check without software intervention.

20 Claims, 2 Drawing Sheets

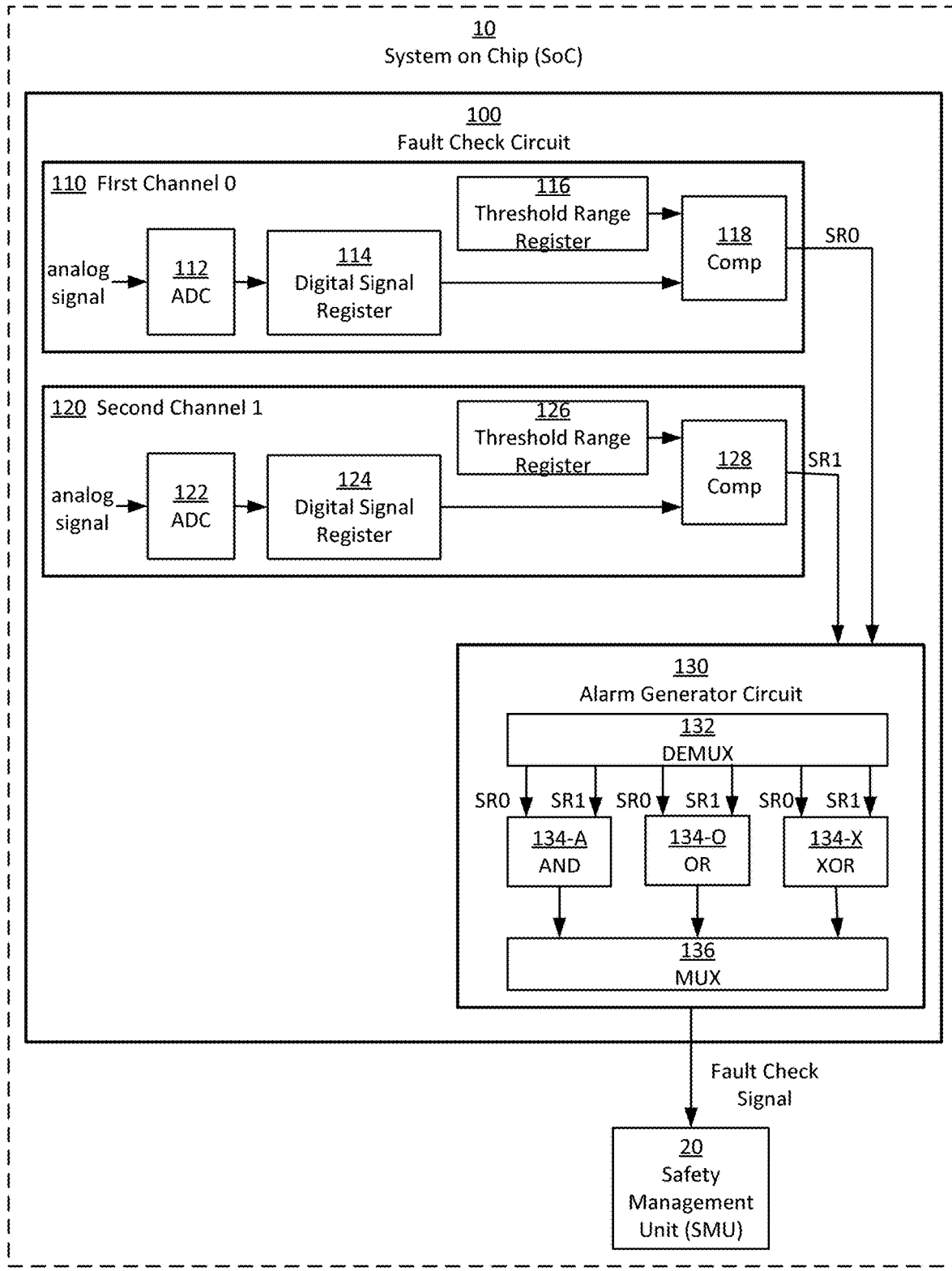

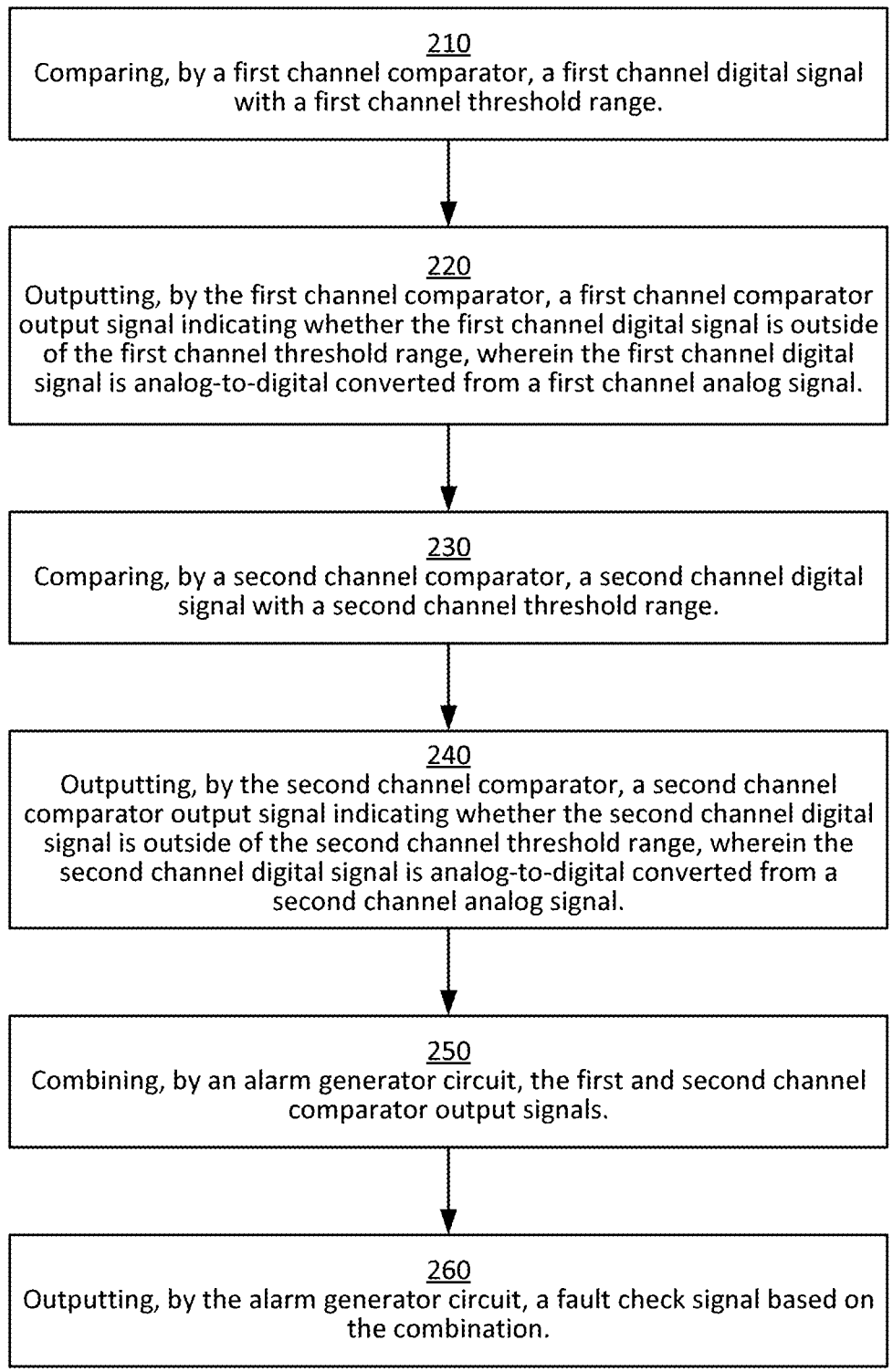

FAULT CHECK WITHOUT SOFTWARE INTERVENTION

BACKGROUND

Many automotive applications are required to be Automotive Safety Integrity Level D (ASIL D). ASIL D refers to International Organization for Standardization (ISO) 26262's highest classification of potential for severely life-threatening or fatal injury in the event of a malfunction, and includes the most stringent level of safety measures to apply for avoiding an unreasonable residual risk.

Analog data acquisition for an Engine Management System (EMS) and braking is ASIL D. Analog data acquisition is a process of measuring an analog data signal, and converting the analog data signal into digital data. For ASIL-D analog data acquisition, at least two homogeneous or heterogeneous Analog-to-Digital Converter (ADC) channels are used to detect random hardware faults. Conventionally, a Central Processing Unit (CPU), which is also ASIL-D, reads values of the different ADC channels, and performs a fault check. The fault check enables software to determine whether the analog data signal is captured without any faults in order to meet ASIL-D requirements. If the fault check indicates a fault, the CPU raises an alarm for reaction, such as by a Safety Management Unit (SMU). Complex System on Chips (SoCs) have more than 100 analog inputs to be measured. Even if only 10% of the signals need to be ASIL D, a fault check on the analog-to-digital conversion signals output from the different channels consumes a considerable amount of CPU bandwidth.

BRIEF DESCRIPTION OF THE DRAWINGS

FIG. 1 illustrates a schematic diagram of a System on Chip (SoC) comprising a fault check circuit in accordance with aspects of the disclosure.

FIG. 2 illustrates a flowchart of a method for performing a fault check in accordance with aspects of the disclosure.

DETAILED DESCRIPTION

The present disclosure is directed to a fault check circuit implemented in hardware, and configured to perform a fault check without software intervention.

FIG. 1 illustrates a schematic diagram of a System on Chip (SoC) 10 comprising a fault check circuit 100 in accordance with aspects of the disclosure, along with a Safety Management Unit (SMU) 20.

The fault check circuit 100 comprises a first channel 110, a second channel 120, and an alarm generator circuit 130. The second channel 120 provides redundancy to the first channel 110. The first and second channels 110, 120 may be homogeneous, or alternatively, may be heterogeneous in any manner as suitable.

The first channel 110 comprises a first channel Analog-to-Digital Converter (ADC) 112, a first channel digital channel signal register 114, a first channel threshold range register 116, and a first channel comparator 118.

The first channel ADC 112 is configured to convert a first channel analog signal to a first channel digital signal to be stored in the first channel digital channel signal register 114. The first channel analog signal is measured and stored using a time window, which may be any length as is suitable. The first digital channel signal and the first channel digital channel signal register may each be referred to herein with reference numeral 114.

The first channel threshold range register 116 is configured to store a threshold range of acceptable first channel digital signal values, wherein a first channel digital signal having a value outside of the range indicates a fault. The register 116 is configured to store a threshold range, as opposed to a threshold value, because the analog portion of the first channel 110 has intrinsic noise. The threshold range has a tolerance based on how safety-critical the measurement is. The more safety-critical the application, the less the possible tolerance, and the les safety-critical the application, the more the possible tolerance. The first channel threshold range register and the first channel threshold range stored therein may each be referred to herein with reference numeral 116.

The first channel comparator 118 is configured to compare the first channel digital signal 114 with the first channel threshold range 116, and output a first channel comparator output signal SR0 indicating whether the first channel digital signal is within the first channel threshold range. For example, if the first channel threshold range 116 is 3.7V-4.8V, and the first digital channel signal 114 has a voltage value that is outside this range (i.e., lower than 3.7V or higher than 4.8V), the first channel comparator output signal SR0 will indicate a fault. For example, the first channel comparator output signal SR0 may indicate a fault when its value is 1, and indicate a safe state when its value is 0, though these values are merely a design choice.

Similar to the first channel 110, the second channel 120 comprises a second channel ADC 122, a second channel digital channel signal register 124, a second channel threshold range register 126, and a second channel comparator 128. In this example the first channel 110 and the second channel 120 are homogeneous and thus operate in the same manner. Briefly, the second channel ADC 122 is configured to convert a second channel analog signal to a second channel digital signal to be stored in the second channel digital channel signal register 124. The second channel threshold range register 126 is configured to store a threshold range of acceptable second channel digital signal values. The second channel comparator 128 is configured to compare the second channel digital signal 124 with the second channel threshold range 126, and output a second channel comparator output signal SR1 indicating whether the second channel digital signal is within the second channel threshold range.

The alarm generator circuit 130 of this example comprises a demultiplexer 132, at least one logic gate 134, and a multiplexer 136. The alarm generator circuit 130 combines the first and second channel comparator output signals SR0, SR1 in a frequency in accordance with application design.

The demultiplexer 132 is configured to demultiplex the first and second channel comparator output signals SR0, SR1 to be input to one or more of the logic gates 134.

The logic gates 134 are configured to combine the first and second channel comparator output signals SR0, SR1, and output a fault check signal. The logic gate 134 may comprise any type or number of logic gates, which may be, for example, selected from an AND gate 134-A, OR gate 134-O, and XOR gate 134-X. If the logic gate is a signal AND gate 134-A, the alarm generator circuit 130 outputs a fault check signal indicating a fault to trigger an alarm when both the first and second channel comparators 118, 128 output a channel comparator output signal SR0, SR1 indicating a fault (e.g., SR0=1 and SR1=1). If the logic gate is a single OR gate 134-O, the alarm generator circuit 130 outputs a fault check signal indicating a fault to trigger an alarm when at least one of the first and second channel comparators 118, 128 outputs a channel comparator output signal SR0, SR1 indicating a fault (e.g., SR0=0 and SR1=1; SR0=1 and SR1=0; or SR0=1 and SR1=1). If the logic gate is a single XOR gate 134-X, the alarm generator circuit 130 outputs a fault check signal indicating a fault to trigger an alarm when only one of the first and second channel comparators 118, 128 outputs a channel comparator output signal SR0, SR1 of 1 (e.g., SR0=0 and SR1=0; or SR0=1 and SR1=0). Of course is there is only a single logic gate 134, the demultiplexer 132 and the multiplexer 136 would not be necessary.

The alarm generator circuit 130, as an alternative to a logic operation, may be designed to perform an arithmetic operation. An example arithmetic operation may be a subtraction performed with a subtracter (not shown) configured to subtract the first and second channel comparator output signals SR0, SR1 from one another, with the difference being used to determine the fault check signal. The difference may be equal to zero (0), be merely positive (+) or negative (−), or the actual amount of the difference. Thus the fault check signal may indicate a fault when the first and second channel comparator output signals SR0, SR1 are not equal, or if they are different by greater than a certain amount.

The multiplexer 136 is configured to select a logic gate output of the plurality of logic gates 134 to output the fault check signal. The fault output signal may be output to, for example, the SMU 20, which is configured to perform an alarm action if the fault check signal indicates a fault. The alarm action may be a system reset, a system shutdown, or a system alert, for example, though the disclosure is not limited in this respect.

The alarm generator circuit 130 may be configured to output the fault check signal within a Fault Tolerant Time Interval (FTTI), such as 10 ms. A FTTI is the time a fault can be present in a system before a hazard occurs. Therefore the FTTI represents a total target time the system needs to meet in order to transition to a safe state. FTTI is always larger than a Diagnostic Time Interval (DTI), which is the time to detect an error. For a combustion engine, a DTI is in a range of milliseconds because there are mechanics between the engine and the wheels. But for an electromotor, the DTI is in a range of only several hundred microseconds because there is no transmission box in between.

There may be more than the two channels 110, 120. For example, there may be a third channel having a third channel comparator implemented in hardware and configured to compare a third channel digital signal with a third channel threshold range, and output a third channel comparator output signal indicating whether the third channel digital signal is outside of the third channel threshold range. The third channel digital signal would be analog-to-digital converted from a third channel analog signal. The alarm generator circuit would be configured to combine the first, second, and third channel comparator output signals in any manner as applicable, such as by a qualified majority decision.

The first channel comparator 118, the second channel comparator 128, and the alarm generator circuit 130 are implemented in hardware. Thus the fault check circuit 100 is configured to perform a fault check without software intervention.

FIG. 2 illustrates a flowchart 200 of a method for performing a fault check in accordance with aspects of the disclosure.

At Step 210, a first channel comparator 118 compares a first channel digital signal 114 with a first channel threshold range 116.

At Step 220, the first channel comparator 118 outputs a first channel comparator output signal SR0 indicating whether the first channel digital signal 114 is outside of the first channel threshold range 116, wherein the first channel digital signal 114 is analog-to-digital converted from a first channel analog signal.

At Step 230, a second channel comparator 128 compares a second channel digital signal 124 with a second channel threshold range 126.

At Step 240, the second channel comparator 128 outputs a second channel comparator output signal SR1 indicating whether the second channel digital signal 124 is outside of the second channel threshold range 126, wherein the second channel digital signal 124 is analog-to-digital converted from a second channel analog signal.

At Step 250, an alarm generator circuit 130 combines the first and second channel comparator output signals SR0, SR1.

At Step 260, the alarm generator circuit 130 outputs a fault check signal based on the combination.

The fault check circuit 100 is configured to perform a fault check in an ASIL D manner using hardware in place of software. In case of a fault, an alarm is raised by the hardware directly without software or CPU involvement.

The techniques of this disclosure may also be described in the following examples.

Example 1. A fault check circuit, comprising: a first channel comparator configured to compare a first channel digital signal with a first channel threshold range, and output a first channel comparator output signal indicating whether the first channel digital signal is outside of the first channel threshold range, wherein the first channel digital signal is analog-to-digital converted from a first channel analog signal; a second channel comparator configured to compare a second channel digital signal with a second channel threshold range, and output a second channel comparator output signal indicating whether the second channel digital signal is outside of the second channel threshold range, wherein the second channel digital signal is analog-to-digital converted from a second channel analog signal; and an alarm generator circuit configured to combine the first and second channel comparator output signals, and output a fault check signal, wherein the first channel comparator, the second channel comparator, and the alarm generator circuit are implemented in hardware, and the fault check circuit is configured to perform a fault check without software intervention.

Example 2. The fault check circuit of example 1, further comprising: a first channel threshold range register configured to store the first channel threshold range; and a second channel threshold range register configured to store the second channel threshold range.

Example 3. The fault check circuit of example 2, wherein: the first channel comparator, the first channel threshold range register, and a first Analog-to-Digital Converter (ADC), which is configured to convert the first channel analog signal into the first channel digital signal, are comprised within a first channel, and the second channel comparator, the second channel threshold range register, and a second ADC, which is configured to convert the second channel analog signal into the second channel digital signal, are comprised within a second channel.

Example 4. The fault check circuit of example 3, wherein the first and second channels are homogeneous.

Example 5. The fault check circuit of example 3, wherein the first and second channels are heterogeneous.

Example 6. The fault check circuit of example 1, wherein the alarm generator circuit is configured to output the fault check signal to a Safety Management Unit (SMU) configured to perform an alarm action based on the fault check signal.

Example 7. The fault check circuit of example 1, wherein the alarm generator circuit comprises a logic gate configured to combine the first and second channel comparator output signals.

Example 8. The fault check circuit of example 7, wherein the logic gate is an AND gate, an OR gate, or an XOR gate.

Example 9. The fault check circuit of example 1, wherein the alarm generator circuit comprises a subtracter configured to subtract the first and second channel comparator output signals.

Example 10. The fault check circuit of example 1, wherein the alarm generator circuit comprises a plurality of logic gates configured to combine the first and second channel comparator output signals to output a plurality of respective logic gate signals.\

Example 11. The fault check circuit of example 10, wherein the alarm generator circuit comprises: a demultiplexer configured to demultiplex the first and second channel comparator output signals to be input to the plurality of logic gates; and a multiplexer configured to select a logic gate of the plurality of logic gates to output the respective logic gate signal.

Example 12. The fault check circuit of example 10, wherein the plurality of logic gates comprise any of an AND gate, an OR gate, and an XOR gate.

Example 13. The fault check circuit of example 1, further comprising: a third channel comparator implemented in hardware and configured to compare a third channel digital signal with a third channel threshold range, and output a third channel comparator output signal indicating whether the third channel digital signal is outside of the third channel threshold range, wherein the third channel digital signal is analog-to-digital converted from a third channel analog signal, wherein the alarm generator circuit is configured to combine the first, second, and third channel comparator output signals by making a qualified majority decision.

Example 14. The fault check circuit of example 1, wherein the alarm generator circuit is configured to output the fault check signal to a Safety Management Unit (SMU) within a Fault Tolerant Time Interval (FTTI).

Example 15. A System on Chip (SoC), comprising: the fault check circuit for performing the fault check as in example 1; and a Safety Management Unit (SMU) configured to perform an alarm action based on the fault check signal.

Example 16. The SoC of example 15, wherein the alarm action is a system reset, a system shutdown, or a system alert.

Example 17. A method for performing a fault check, comprising: a first channel comparator comparing a first channel digital signal with a first channel threshold range, and outputting a first channel comparator output signal indicating whether the first channel digital signal is outside of the first channel threshold range, wherein the first channel digital signal is analog-to-digital converted from a first channel analog signal; a second channel comparator comparing a second channel digital signal with a second channel threshold range, and outputting a second channel comparator output signal indicating whether the second channel digital signal is outside of the second channel threshold range, wherein the second channel digital signal is analog-to-digital converted from a second channel analog signal; and an alarm generator circuit combining the first and second channel comparator output signals, and outputting a fault check signal based on the combination, wherein the first channel comparator, the second channel comparator, and the alarm generator circuit are implemented in hardware, and the method is performed without software intervention.

Example 18. The method of example 17, wherein the combining comprises: a multiplexer selecting a logic gate of a plurality of logic gates, and outputting a logic gate signal of the selected logic gate.

Example 19. The method of example 17, further comprising: a Safety Management Unit (SMU) performing an alarm action based on the fault check signal.

Example 20. The method of example 19, wherein the fault check signal indicates a fault when the first and second channel comparator output signals are not equal.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A fault check circuit, comprising:
   a first channel comparator configured to compare a first channel digital signal with a first channel threshold range, and output a first channel comparator output signal indicating whether the first channel digital signal is outside of the first channel threshold range, wherein the first channel digital signal is analog-to-digital converted from a first channel analog signal;
   a second channel comparator configured to compare a second channel digital signal with a second channel threshold range, and output a second channel comparator output signal indicating whether the second channel digital signal is outside of the second channel threshold range, wherein the second channel digital signal is analog-to-digital converted from a second channel analog signal; and
   an alarm generator circuit configured to combine the first and second channel comparator output signals, and output a fault check signal,
   wherein the first channel comparator, the second channel comparator, and the alarm generator circuit are implemented in hardware, and the fault check circuit is configured to perform a fault check without software intervention.

2. The fault check circuit of claim 1, further comprising:
   a first channel threshold range register configured to store the first channel threshold range; and
   a second channel threshold range register configured to store the second channel threshold range.

3. The fault check circuit of claim 2, wherein:
   the first channel comparator, the first channel threshold range register, and a first Analog-to-Digital Converter (ADC), which is configured to convert the first channel analog signal into the first channel digital signal, are comprised within a first channel, and the second channel comparator, the second channel threshold range register, and a second ADC, which is configured to convert the second channel analog signal into the second channel digital signal, are comprised within a second channel.

4. The fault check circuit of claim 3, wherein the first and second channels are homogeneous.

5. The fault check circuit of claim 3, wherein the first and second channels are heterogeneous.

6. The fault check circuit of claim 1, wherein the alarm generator circuit is configured to output the fault check signal to a Safety Management Unit (SMU) configured to perform an alarm action based on the fault check signal.

7. The fault check circuit of claim 1, wherein the alarm generator circuit comprises a logic gate configured to combine the first and second channel comparator output signals.

8. The fault check circuit of claim 7, wherein the logic gate is an AND gate, an OR gate, or an XOR gate.

9. The fault check circuit of claim 1, wherein the alarm generator circuit comprises a subtracter configured to subtract the first and second channel comparator output signals.

10. The fault check circuit of claim 1, wherein the alarm generator circuit comprises a plurality of logic gates configured to combine the first and second channel comparator output signals to output a plurality of respective logic gate signals.

11. The fault check circuit of claim 10, wherein the alarm generator circuit comprises:
    a demultiplexer configured to demultiplex the first and second channel comparator output signals to be input to the plurality of logic gates; and
    a multiplexer configured to select a logic gate of the plurality of logic gates to output the respective logic gate signal.

12. The fault check circuit of claim 10, wherein the plurality of logic gates comprise any of an AND gate, an OR gate, and an XOR gate.

13. The fault check circuit of claim 1, further comprising:
    a third channel comparator implemented in hardware and configured to compare a third channel digital signal with a third channel threshold range, and output a third channel comparator output signal indicating whether the third channel digital signal is outside of the third channel threshold range, wherein the third channel digital signal is analog-to-digital converted from a third channel analog signal,
    wherein the alarm generator circuit is configured to combine the first, second, and third channel comparator output signals by making a qualified majority decision.

14. The fault check circuit of claim 1, wherein the alarm generator circuit is configured to output the fault check signal to a Safety Management Unit (SMU) within a Fault Tolerant Time Interval (FTTI).

15. A System on Chip (SoC), comprising:
    the fault check circuit for performing the fault check as claimed in claim 1; and
    a Safety Management Unit (SMU) configured to perform an alarm action based on the fault check signal.

16. The SoC of claim 15, wherein the alarm action is a system reset, a system shutdown, or a system alert.

17. A method for performing a fault check, comprising:
    a first channel comparator comparing a first channel digital signal with a first channel threshold range, and outputting a first channel comparator output signal indicating whether the first channel digital signal is outside of the first channel threshold range, wherein the first channel digital signal is analog-to-digital converted from a first channel analog signal;
    a second channel comparator comparing a second channel digital signal with a second channel threshold range, and outputting a second channel comparator output signal indicating whether the second channel digital signal is outside of the second channel threshold range, wherein the second channel digital signal is analog-to-digital converted from a second channel analog signal; and
    an alarm generator circuit combining the first and second channel comparator output signals, and outputting a fault check signal based on the combination,
    wherein the first channel comparator, the second channel comparator, and the alarm generator circuit are implemented in hardware, and the method is performed without software intervention.

18. The method of claim 17, wherein the combining comprises:
    a multiplexer selecting a logic gate of a plurality of logic gates, and outputting a logic gate signal of the selected logic gate.

19. The method of claim 17, further comprising:
    a Safety Management Unit (SMU) performing an alarm action based on the fault check signal.

20. The method of claim 19, wherein the fault check signal indicates a fault when the first and second channel comparator output signals are not equal.

* * * * *